INVENTOR.
ROBERT R. SALMANS
BY
ATTORNEY

United States Patent Office 3,438,670
Patented Apr. 15, 1969

3,438,670
SHELTER ASSOCIATED WITH AUTOMOTIVE
PASSENGER VEHICLE
Robert R. Salmans, Wichita, Kans., assignor to Ceramics of Kansas, Inc., Wichita, Kans., a corporation of Kansas
Filed Nov. 28, 1966, Ser. No. 597,365
Int. Cl. B60p 3/34
U.S. Cl. 296—23                                    25 Claims

ABSTRACT OF THE DISCLOSURE

A shelter is erected behind a station wagon or the like during use and is stored on top of the vehicle during transportation. Roof and rear wall side portions fold during transportation so that a shelter can be provided which is wider than the vehicle during use but which is no wider than the vehicle during transportation. The roof is erected to a height higher than the vehicle by short forward legs resting on the vehicle top. Tracks are secured to the top of the vehicle and the shelter has rollers to roll in the tracks for convenience in moving the shelter on and off the vehicle and for securing the shelter during transportation. Side and front end walls are of flexible sheet material and the front end wall has a "draw string" to secure it about the rear end of the vehicle. When the rear door of a station wagon is opened, vehicle and shelter space become common.

Brief summary of the invention

The above abstraction of the disclosure generally outlines the structure of the specific embodiment of the invention. Primary features of the invention include providing more head room than is inherent in a shelter resting on the top of a station wagon or the like and providing more width than would be expected in a shelter including a rigid top (as well, in the specific embodiment, as a rigid rear wall in which door means are provided) which is to be transported on top of a vehicle. Removable flexible sheet material front and side walls include the "draw string" feature to solve the problem of providing a closure around the rear end of a station wagon or the like. Various provisions are made for transporting the shelter on top of the vehicle, including folding, removable parts, and track and roller means.

Introduction

Population growth, higher standard of living, improved transportation, increasing interest in outdoor recreation, and other factors have resulted in increased sales of camping shelters which include diverse types including "house"-type trailers, enclosures on "pickup" trucks, tents, shelters erecting during transportation and collapsed during use supported by trailers pulled behind vehicles, etc. There are various considerations including time spent erecting the shelter, the weight and wind influence during transportation, convenience, cost, protection from the elements, the amount of use the owner expects to give the shelter, etc. It is an objective of my invention to provide a shelter of relatively low cost; of relatively large size in width and height for convenience in use; of relatively rapid erection and disassembly; of relatively low weight, low wind influence, and convenience during transportation; providing relatively good protection from the elements; and of particular adaptability and value when used with a station wagon by providing for common space between the vehicle and shelter when the vehicle rear door is opened. I recognize in my invention the large number of station wagons that are sold, the sleeping and other room inherent in the station wagons, and the potential usage of a shelter which is particularly adapted for use with station wagons.

Other objectives of my invention include to provide a shelter shown in collapsed, transport position on the top terials which is of a size to be transported on top of a vehicle and yet provides greater height and width than the vehicle when erected; to provide a shelter providing a good closure around the rear end of a station wagon or other vehicle; and to provide other desirable features and characteristics and to make suitable compromises among desirable features and characteristics to the extent these conflict. It is a further objective of my invention to provide a shelter in a relatively low-price range, so as to be within the means of people of limited financial means, or so as to be suitable for persons expecting rather low usage of the shelter so that investment in the shelter should be relatively limited.

Other objectives and advantages of my invention will be understood from the following description.

*Detailed description*

Figure 8:
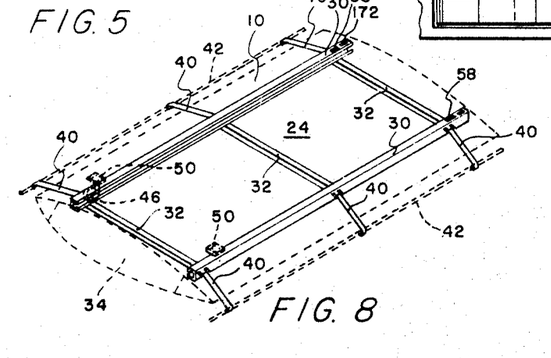
FIGURE 8 is a perspective view from above and in front of the station wagon top showing details of tracks and means for securing the same in place.

The principal parts include track means 10 securing to the top of the station wagon 12 (see particularly FIGURE 8), a rigid shelter roof 14, rear shelter wall 16, side walls 18, and a front wall or closure 20 about the rear end of station wagon 12. When the parts are erected, a shelter is formed by roof 14, rear wall 16, side walls 18 and the front wall or closure 20 together with the station wagon. When the rear door and window combination of station wagon 12 are opened, there is common space or access between the shelter and the interior of the station wagon for use in space for sleeping and other purposes. In a sense, then, the station wagon rear becomes a part of the front shelter wall. The shelter can be collapsed, disassembled and folded for compact storage on top 24 of station wagon 12 for transportation. A station wagon is shown as the shelter is particularly useful with a station wagon, but it will be understood the shelter can be adapted for use with other private passenger automotive vehicles.

To first describe track means 10 and associated parts, two tracks 30 are shown to be of channel shaped construction. The channel shapes are preferred as they are used partly to retain shelter members in transport position, the upper channel flange preventing upward escape of rollers secured to the shelter, but other type tracks can be used if other or additional shelter securing means are substituted. The tracks are secured together by transverse members 32. A transverse windbreaker member 34 is secured to the forward end of track means 10. Windbreaker 34 covers the forward end of shelter roof 14 and other shelter parts when folded and collapsed for transport. Shelter roof 14 has folded sections extending outwardly beyond the margins of tracks 30, and windbreaker 34 extends outwardly beyond the margins of tracks 30 to cover this structure, to minimize wind action, to prevent fouling with bugs, during travel, etc. Windbreaker 34 has a streamlined forward end for minimizing drag and wind action on the shelter.

Track means 10 is secured to top 24 of station wagon 12 by means generally similar to ones previously used in securing luggage racks to the tops of automotive vehicles. These means include suction cups 38 bearing on the vehicle top 24 and strap means 40 extending from the sides of the tracks and securing to the vehicle eave drip cap strips 42, the straps being doubled and having securing buckles, so they can be tightened, and having suitable clips at their ends (these not being detailed because they are similar to the securing means above mentioned used with luggage racks, and already known in the art).

A pair of forward rollers 46 are secured to and depend from the bottom of shelter roof 14. The rollers 46 are rotatably supported by arms 48 which have pads 50 secured to shelter roof 14 by rivets 52. They are received into channel tracks 30 and removed therefrom through rear end openings 58. Rollers 46 support the forward end of shelter roof 14 as it is moved forwardly to load the shelter onto station wagon top 24 and as roof 14 is moved rearwardly to move the shelter from transport position to erected position. One of the first steps in loading is to lower rollers 46 through slots 58 into engagement in tracks 30 and one of the steps in unloading of the shelter is to move shelter roof 14 rearwardly while the front end is supported on rollers 46 running on tracks 30 until the location of the upwardly open slot or opening 58 is reached, whereupon rollers 46 are moved upwardly freeing the same from tracks 30. It may be noted at this point that this step would not be needed if the shelter roof were to rest directly on top 24 of station wagon 12 or other automotive vehicle, but I have found that generally this will make too low a shelter roof and it is necessary that the shelter roof be freed from the tracks and disposed at a level considerably above station wagon top 24 in order to have adequate head room, e.g., it is desirable to have at least six foot clearance under shelter roof 14. For the purpose of this specification and claims, to avoid indefiniteness "head room" above the level of the vehicle top is defined as having a minimum height of at least the average height of the adult human head. Of course, more realistically something like six feet standing room would be desirable.

Figure 1:
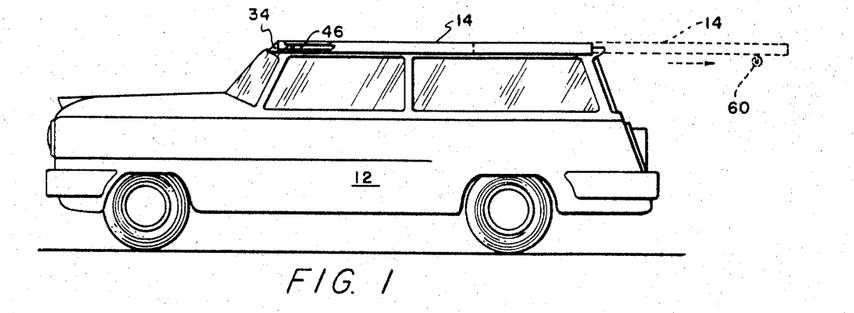
FIGURE 1 is a side view of a station wagon having a shelter shown in collapsed, transport position on the top of the car, the shelter shown being a specific embodiment of my invention. Certain parts are broken away and shown in section to reveal hidden structure. In dotted lines is shown the first step in moving the shelter from collapsed to erected position.
Figure 3:
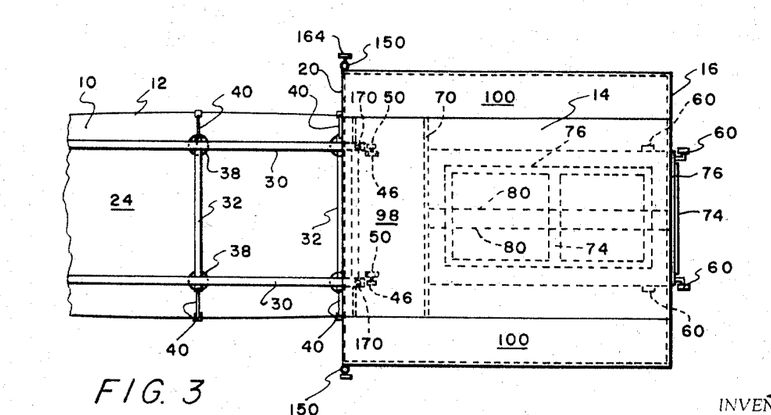
FIGURE 3 is a top view of the structure shown in FIGURE 2, the folded position of rear door, door frame and rear side panels being indicated in dotted lines.
Figure 4:
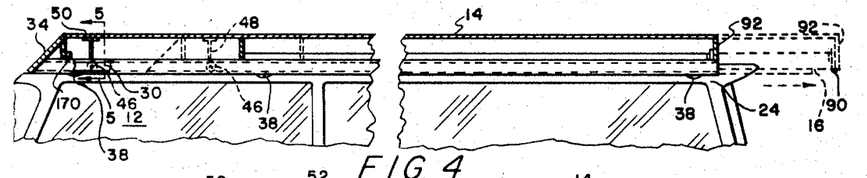
FIGURE 4 is a fragmentary view in the same sense as FIGURE 1 but on enlarged scale, with certain parts broken away and with some parts shown in section, the dotted lines at the right indicating movement from transport to erected position.
Figure 5:
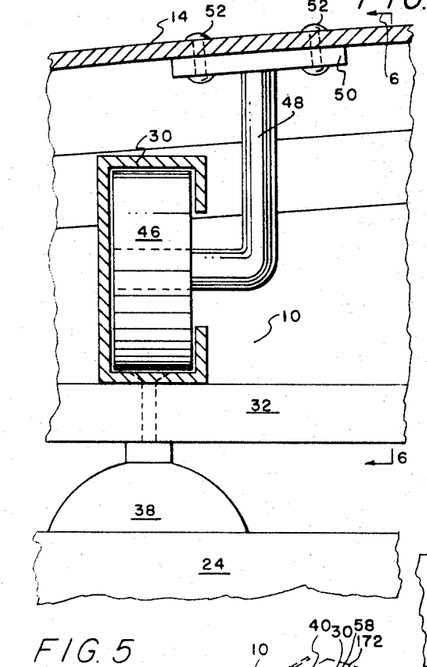
FIGURE 5 is a view taken on line 5—5 of FIGURE 4, on enlarged scale and fragmentary, and partly in section, showing particularly roller and track details.
Figure 6:
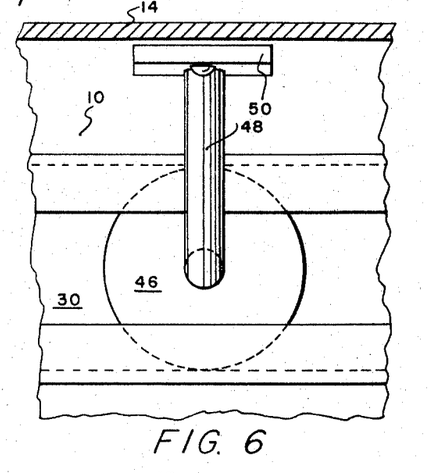
FIGURE 6 is similar to FIGURE 5 only being taken on line 6—6 of FIGURE 5.
Figure 7:
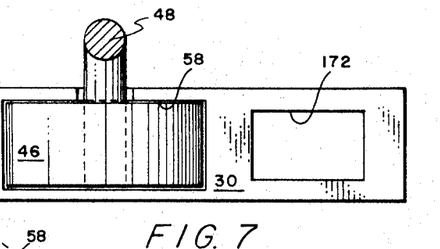
FIGURE 7 is a view somewhat similar to FIGURES 5 and 6, being particularly of track and roller details, the view being taken at a location where there is a top opening or slot in the track for release of the roller and in which there are recesses for receiving certain leg members.
Figure 9:
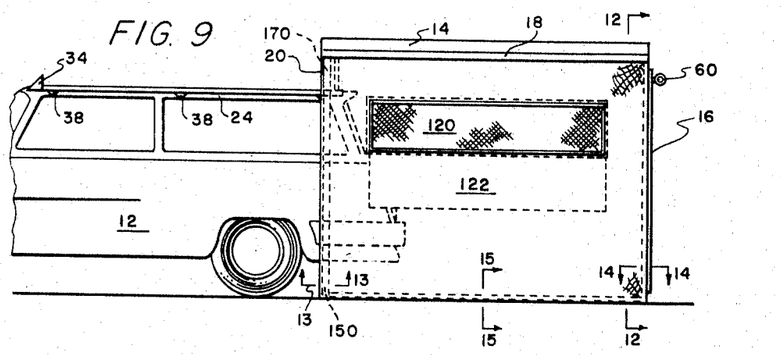
FIGURE 9 is a view similar to that of FIGURE 2 but with flexible sheet walls in place.
Figure 10:
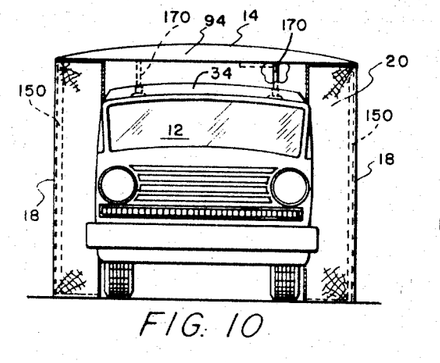
FIGURE 10 is similar to FIGURE 9 but is taken from in front of the station wagon.
Figure 11:
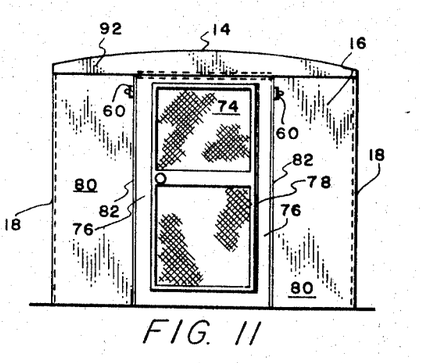
FIGURE 11 is similar to FIGURES 9 and 10 but is a rear view of the shelter.
Figure 12:
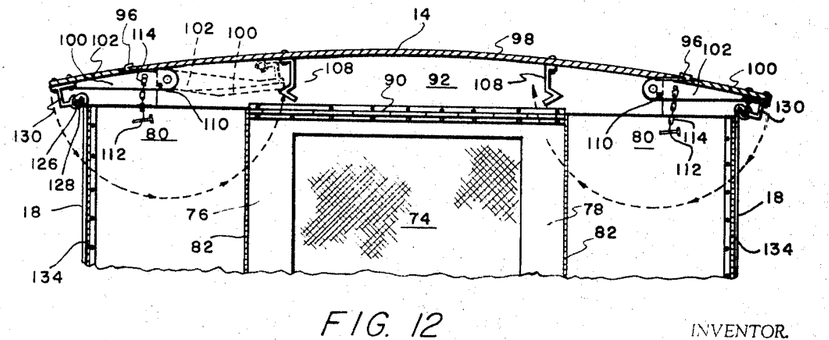
FIGURE 12 is a fragmentary view taken on line 12—12 of FIGURE 9 and showing certain details of roof and rear wall construction on enlarged scale and partly in section.
Figure 13:
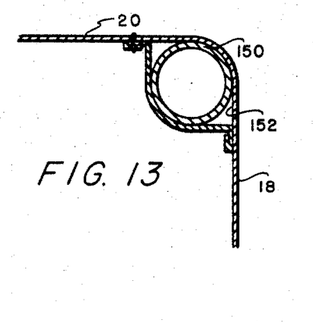
FIGURE 13 is a view taken on line 13—13 of FIGURE 9 showing certain front corner post details on enlarged scale and in section.
Figure 14:
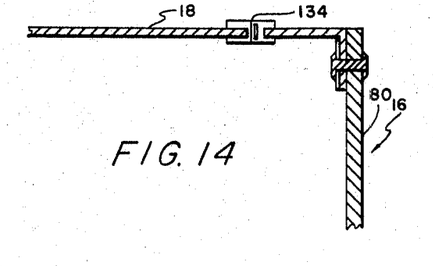
FIGURE 14 is a view taken on line 14—14 of FIGURE 9 showing certain details of the rear corners on enlarged scale and partly in section.
Figure 15:
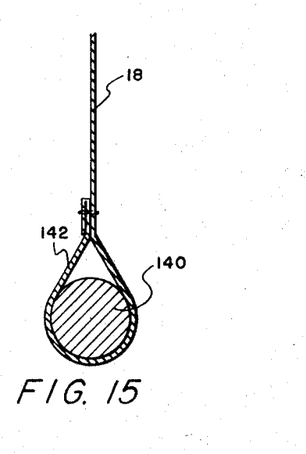
FIGURE 15 is a view taken on line 15—15 of FIGURE 9 showing certain details of the side wall lower margins on enlarged scale and in section.
Figure 16:
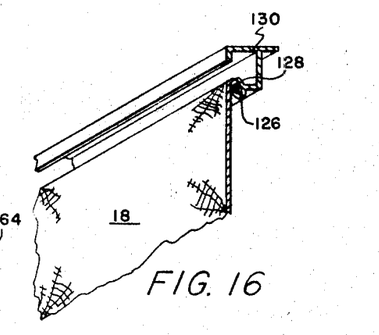
FIGURE 16 is a perspective view of certain details of the side wall upper margins on enlarged scale and in section.
Figures 17, 18:
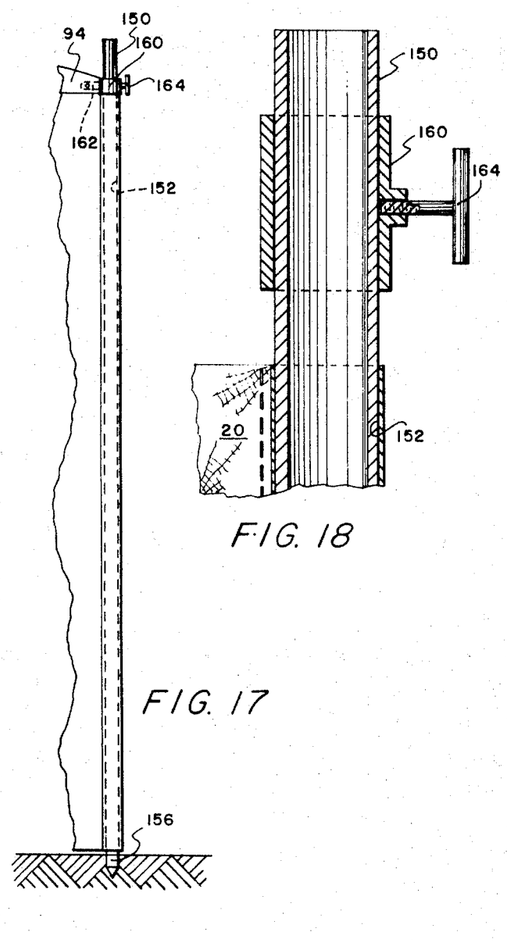
FIGURE 17 is a fragmentary front view showing certain details of the front corners of the shelter.
FIGURE 18 is a view in the same sense as FIGURE 17 but on enlarged scale and fragmentary, showing certain details partly in section.

A pair of rear rollers 60 are preferably disposed on the rear door frame, to depend from the shelter assembly when it is collapsed including the folding of the rear wall to the position shown in FIGURE 3 in dotted lines in which the door and door frame are parallel to shelter roof 14 and rear rollers are moved from their horizontally outstanding position (see FIGURES 6 and 9) to a depending position (see FIGURE 1) disposed to be engaged by track means 10. Note that rear rollers 60 really do not help support the shelter very much in its forward and rearward movement, to transport and erected positions respectively, and they are provided more as a securing means for the rear end of the shelter in transport position. Rollers 60 drop through slot openings 58 in tracks 30 to become engaged in tracks 30 during loading and escape through slot openings 58 during unloading, in a similar manner to front rollers 46. As the rear rollers are essentially engaging means limiting transverse and longitudinal shifting, other engaging means could be substituted. Rear rollers 60 may be moved forwardly after entering slot openings 58 in tracks 30, in which case appropriate securing means are used to prevent rearward movement of the rollers (and shelter) in tracks 30. I have not lengthened this disclosure by particularly detailing all securing means to "snug down" the shelter in transport position on station wagon top 24 (to prevent rattle, vibration under wind action, etc.) as these can take various forms ranging from integral clamping means to external straps or ropes. As above indicated, in the preferred embodiment of my invention the primary securing is by the action of rollers 60 in tracks 30, in which the rollers are snugly retained in tracks 30 by top and bottom engagement with track channel flanges. Rollers 60 may take the general form of roller skate wheels (with surfaces having some resiliency and low abrasive qualities). However, it is appreciated that, within the skill of the art, other track-roller structures can be substituted as well as different or additional securing provisions.

To now deal in more detail with the shelter structure, in the process of erection (i.e., moving from the FIGURE 1 to the FIGURE 2 condition), one of the early steps is to lower the structure forming rear wall 16. As shown in FIGURE 3, during transportation the rear wall structure is upwardly folded parallel to shelter roof 14 and may be suitably secured to one of the roof transverse stiffening members 70. When rear wall 16 is lowered it forms one of the primary supports for roof 14. Although it would be possible to provide rigid poles or the like in the rear wall or corners to support the roof, and to use flexible sheet material such as canvas in the rear wall, in the specific embodiment I have elected to form the rear wall primarily of rigid sheet material such as aluminum, thereby providing door, door frame, enclosing and structural strength functions in the rear wall which add to the convenience of the shelter and to the stability of the structure.

It was found in providing a shelter transportable on top of the car, and using some rigid sheets in roof and/or rear wall, that the shelter would be too limited in width unless some extraordinary provision were made to provide widths transportable on top of a station wagon and yet conveniently wide for use as a shelter. I conceived of the structure shown in which both rigid roof 14 and rigid rear wall 14 have outlying folding sections whereby the structure can be unfolded to a width greater than that of a normal automotive passenger vehicle during use as a shelter and the structure can be folded to a width substantially no greater than the width of such normal automotive vehicle during transportation.

Rear wall 16, hence, includes metal door 74 pivotally secured to metal door frame 76 by piano hinges 78, and includes rear side panels 80 pivotally secured to metal door frame 76 by piano hinges 82, the rear side panels 80 not being permanently secured to the roof structure so that they can be inwardly folded in the process of folding the shelter for loading (to abut against the inside of door and door frame). The door frame 76 is pivotally secured to the roof structure by piano hinges 90 for upward folding during loading as before described. With this provision for folding the rear wall (as well as folding of roof to be described) it is quite flexible, for example, to provide a six foot wide structure, and to still merely fold for loading as distinguished from a structure requiring disassembly and the like to reduce width for transportation.

To provide for room for the folded assembly of panels 80, door 74 and door frame 76 under a roof which, as will be described, has its own underfolding parts, either a special hinge structure must be used or the hinge line must be moved down from the roof line, and it will be observed that the roof end transverse stiffener plate 92, forms a short wall extending somewhat below the edge of the roof a sufficient distance so that room is allowed for folding parts.

Turning now to the roof, a suitable length may be about eight feet although of course this can vary according to various considerations. Aluminum sheet is suitable, although of course plastic sheeting could be substituted. The top of the roof has some transverse curvature or slope and transverse stiffeners are used as needed including the stiffeners 70, 92 already mentioned and a front end stiffener 94. The folding roof parts of course have to be inside of the end stiffeners, or to include the same, and intermediate stiffeners must be short or folding, to prevent interference. Folding roof and rear wall joints may have sealing or weatherstripping as needed in case of rain, etc., and a seal 96 is shown at the joint between central roof portion 98 and side roof portions 100. Hinge members 102 are provided between side roof portions 100 and central roof portion 98 (the hinges actually connected to stiffeners 92, 94). When the side roof portions are folded under central roof portion 98 in the process of taking down the shelter for transportation, they are secured by spring clips 108. As in the case of the rear wall, the folding roof structure makes feasible an erected structure of, say, six feet, although this is considerably wider than a normal private passenger vehicle.

The roof may be supported and side roof portions 100 may be held in extension from central roof portion 98 by the rigid rear wall and by forward corner posts, but it may be desirable to provide other means for holding side roof portions 100 extended, and this can take the form of aligned openings 110 in stiffener plates and the arms of hinges 102, and pins 112 positioned in the aligned openings (retained against loss when not in use by chains 114).

Side walls 18 are preferably formed of flexible sheet material such as canvas and may have screen windows 120 covered when needed by flaps 122. They may be secured at their upper margins by means including a corded hem 126 threaded into a slotted groove 128 formed in an extrusion 130 secured to the under edges of roof 14. Side walls 18 are secured to rear walls 16 by a slide fastener 134 secured by rivets and by sewing to rear side panels 80 and side wall 18 respectively. The bottom end of side walls 18 is weighted (particularly if a floor is not used) by a metal rod 140 received in a hem 142. Front canvas wall 20 may have a similar or other fastening to transverse plate 94 and may have a similar weighed lower edge.

Figure 2:
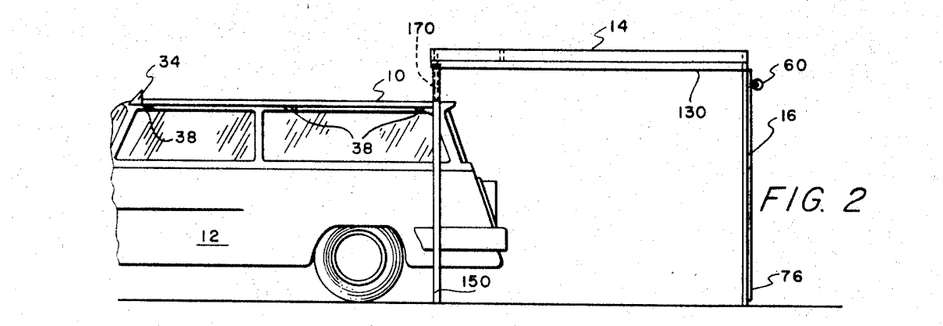
FIGURE 2 is a side view showing the shelter in the next stage of erection, flexible sheet walls not being yet in place.

Front corner posts are provided to form the corners and to support the roof by means of tubes or pipes 150 received in an upright pocket 152 sewed in the canvas at the juncture of side walls 18 and front wall or closure 20. Tubes 150 have pointed lower ends 156 stuck in the ground. As the front end of roof 14 is supported on the station wagon 12 and as the ground may have some slope, the distance between the ground and the roof will not always be the same. For this reason, tubes 150 are secured to the roof in a manner permitting some variance in this height, and the securing means includes a collar 160 pivotally secured to front stiffener plate 94 at 162 and a set or turn screw 164 for adjustably securing tube 150. (Althrough FIGURE 2 shows tube 150 in place without being recevied in pocket 152, tube 150 will be positioned in pocket 152 before being permanently secured in place during shelter erection unless pocket 152 has fasteners so that the canvas panel can be later installed rather than being threaded into place on tube 150.)

Besides tubes 150, the front end of roof 14 is supported by short legs 170 which are pivotally connected at their upper ends to front transverse stiffener 94 (to fold inwardly transversely out of the way during folding of the shelter for transportation) and are received at their lower ends in slots 172 in tracks 30. By these leg means, I have provided that the front end of roof 14 is supported by the rear end of the station wagon 12 and yet the height of the structure is not determined by the limitation of a roof directly resting on the station wagon. This provision of "head room" is an important feature that permits making a shelter with six feet or so clearance when erected.

Figure 19:
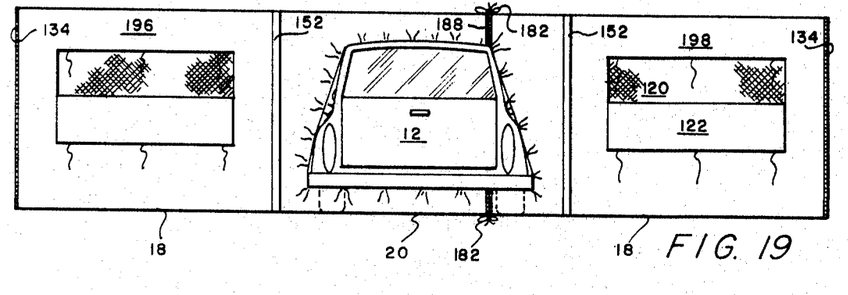
FIGURE 19 is a view particularly of the flexible sheet panels in laid out form showing the two sections secured together and drawn about the station wagon in the plane of the rear shelter wall.
Figure 20:
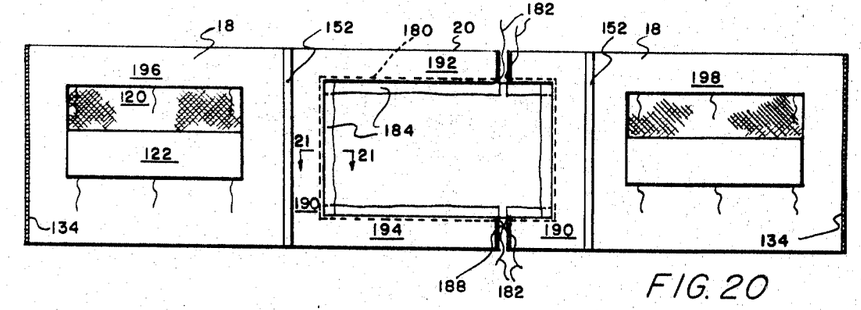
FIGURE 20 is a view similar to that of FIGURE 19 but showing the two panel sections before they are secured together.
Figure 21:
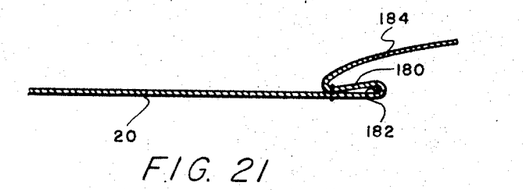
FIGURE 21 is a view taken on line 21—21 of FIGURE 20 showing certain details of the rear panel walls on enlarged scale and in section.

It is desirable to use my shelter with a station wagon, although it can be used with other private passenger vehicles, because the station wagon sleeping space can not only be used but may be opened directly into the shelter for use during sleeping and other hours during camping. It is important as against insects, weather, etc., to provide a good seal of the front wall 20 about the end of the station wagon in the plane of the front wall. I have provided this by a "draw string" arrangement in which the canvas (or other flexible material) wall is hemmed at 180 to receive cord means 182. A flap 184 is provided beyond the hem so that material is available to stuff in any space between the corded hem and the station wagon body (when the corded hem is drawn about the rear end of the station wagon there is likely to be some concave areas which are left open by the cord drawn between convex areas and the flap material 184 can be stuffed in such concave areas). In order to install the front wall near the later part of the shelter erection process, it is divided at one side margin 188 so that it can be slipped around the station wagon at any time. Front wall 20 or closure has side portions 190, top portion 192, and bottom portion 194. It is convenient to provide the canvas walls in two sections, a first section 196 forming one side wall 18, one front side portion 190, and top and bottom portions 194; and tha other section 198 forming one side wall 18 and one front side portion 190, the two sections being joined by suitable fastening means and by the tieing of cords 182 as shown in FIGURE 19. Other means can be substituted for the "draw string," such as grommets formed in the canvas and turn fastener members secured to the station wagon.

Having thus described my invention, I do not wish to be understood as limiting myself to the precise details of construction shown and instead wish to cover those modifications thereof which will occur to those skilled in the art after learning of my invention and which are properly within the scope of my invention.

I claim:

1. The improvement in the combination of an automotive passenger vehicle and a shelter forming an enclosure behind and at the rear of said vehicle, said vehicle having a top, comprising:

(a) a generally flat rigid shelter roof having generally a uniform transverse cross section from end to end thereof,
   said shelter roof being stored for transportation by being positioned superposed on said vehicle top,
   said shelter roof being normally wider than said vehicle and having rigid sheet side roof portions hingedly connected to a central roof portion to pivot about horizontal axes,
      said side roof portions being pivotal from a first extended position during use as a shelter at the rear of said vehicle in which said side roof portions extend outwardly from said central roof portion in the same general plane, downwardly and inwardly to a second folded position during storage on said vehicle top in which said side roof portions are folded under and abutting said central roof portion,
   whereby a shelter is provided which is wider during use as a shelter than the width of said vehicle and the shelter roof is folded during transportation to a width substantially no wider than the vehicle;

(b) wall means from ground to shelter roof including rear upright means supporting the rear end of said shelter roof from the ground; and (c) forward upright means between the foreward end of said shelter roof and said vehicle top, including upright members supporting the forward end of said shelter roof at a level spaced above said vehicle top, providing head room in said shelter above the top of said vehicle subtsantially from end to end of said shelter.

2. The subject matter of claim 1 in which said rear upright means is wider than said vehicle in erected position and said rear upright means includes a rear wall, hingedly connected to said shelter roof, formed by a rigid sheet-like centerally located door, by a door frame, and by sheet side panels at each side of said door frame and hingedly connected to said door frame and pivotal from a first extended position during use as a shelter at the rear of said vehicle in which said side panels extend outwardly from said door frame in the same general plane, to a second folded position during storage on said vehicle top in which said side panels are folded and abut said door frame and door, and the rear wall is upwardly folded to abut said roof whereby a shelter is provided which is wider during use as a shelter than the width of said vehicle and the rear wall is folded during transportation to a width substantially no wider than the vehicle.

3. The improvement in the combination of an automotive passenger vehicle and a shelter forming an enclosure behind and at the rear of said vehicle, said vehicle having a top, comprising:

(a) a generally flat rigid shelter roof having generally a uniform transverse cross section from end to end thereof, (b) wall means from ground to shelter roof including rear upright means supporting the rear end of said shelter roof from the ground; and (c) forward upright means between the forward end of said shelter roof and said vehicle top, including upright members supporting the forward end of said shelter roof at a level spaced above said vehicle top, provding head room in said shelter above the top of said vehicle substantially from end to end of said shelter,
   said forward upright means including a pair of legs pivotally secured to said shelter roof and disposed in a folded position folded up against said roof in stored transportation of said shelter and disposed in extended upright position during use of said shelter with the lower ends of said legs supported by the top of said vehicle.

4. The subject matter of claim 3 in which said vehicle has means secured thereto engaging the lower ends of said legs in said extended upright position thereof.

5. The subject matter of claim 4 in which said means secured to said vehicle is paired track means extending longitudinally of said vehicle top having slots receiving the lower ends of said legs, said roof having rollers at its forward end and said track means being adapted to receive and support said rollers and having openings near rear ends thereof for release and receipt of said rollers, whereby to transport said roof said legs are removed from said slots and upwardly folded and said rollers are lowered with said roof into engagement with said track means through said rear end openings, and said rollers and track means support the forward end of said roof as said roof is moved forwardly into superposition to said vehicle top, and whereby to move said roof from transported forward position to rear erected position said roof is moved rearwardly supported by said rollers and track means at its forward end, and said rollers escape from said track means through said rear end openings, and said legs are unfolded and said roof is raised and the lower ends of said legs are disposed in said slots.

6. The subject matter of claim 5 in which there is a second pair of rollers secured to said rear upright means, and in which in moving said roof forwardly from erected to transport position said rear upright means is folded upwardly against said roof thereby positioning said second pair of rollers in depending position and said second pair of rollers is engaged in said track means through said rear end openings as said roof is moved forwardly and said second pair of rollers become aligned with said rear end openings.

7. The subject matter of claim 6 in which said roof has side roof portions hingedly connected to a central roof portion and said side roof portions are pivoted under said cental roof portion before said roof is moved forwardly from erected to transport position, and said rollers and track means are spaced and positioned to fit between said side roof portions in the folded position thereof.

8. The improvement in the combination of an automotive passenger vehicle and a shelter forming an enclosure behind and at the rear of said vehicle, said vehicle having a top, comprising:

(a) a generally flat rigid shelter roof having generally a uniform transverse cross section from end to end thereof, (b) wall means from ground to shelter roof including rear upright means supporting rear end of said shelter roof from the ground;

(c) forward upright means between the forward end of said shelter roof and said vehicle top, including upright members supporting the forward end of said shelter roof at a level spaced above said vehicle top, providing head room in said shelter above the top of said vehicle substantially from end to end of said shelter, and (d) paired tracks extending longitudinally of said vehicle top, transverse members between said tracks, suction cups under said tracks bearing on the vehicle top, strap means extending from the sides of said tracks, eave drip cap strips along the upper sides of said vehicle to which said strap means are secured to fasten said tracks to the vehicle top, and rollers depending from the forward end of said roof, said forward upright means being hinged to said roof for folding, whereby said shelter roof may be moved from erected position behind said vehicle to transport position on said vehicle top by folding of said forward upright means up against said roof, by lowering said roof to engage said rollers with said tracks, and by moving said roof forwardly into superposition with said vehicle top while supporting the forward end of said roof by said rollers rolling along said tracks.

9. The subject matter of claim 8 in which there is a transverse windbreaker member at the forward end of said track which covers the forward end of said roof when said roof is in forward transport position, said windbreaker having a streamlined forward end for minimizing wind action on the roof and track assembly.

10. The improvement in the combination of an automotive passenger vehicle and a shelter forming an enclosure behind and at the rear end of said vehicle, and to be transported on the top of said vehicle comprising:
(a) a shelter roof formed of rigid material,
(b) means supporting said shelter roof in use as an enclosure,
(c) said shelter roof being normally wider than said vehicle and having rigid sheet side roof portions hingedly connected to a central roof portion to pivot about horizontal axes, said side roof portions being pivotal from a first extended position during use as a shelter at the rear of said vehicle in which said side roof portions extend outwardly from said central roof portion in the same general plane, to a second folded position during storage on said vehicle top in which said side roof portions are folded to abut said central roof portion whereby a shelter is provided which is wider during use as a shelter than the width of said vehicle and the shelter roof is folded during transportation to a width substantially no wider than the vehicle.

11. The subject matter of claim 10 in which there is a rear wall supporting the rear end of said roof in erected condition of said shelter which is normally wider than said vehicle, said rear wall is hingedly connected to said shelter roof and is formed by a centrally located door, by a door frame, and by rigid side panels at each side of said door frame and hingedly connected to said door frame and pivotal from a first extended position during use as a shelter at the rear of said vehicle in which said side panels extend outwardly from said door frame in the same general plane, to a second folded position during storage on said vehicle top in which said side panels are folded and abut said door frame and door, and said rear wall is upwardly folded to abut the underside of said roof whereby a shelter is provided which is wider during use as a shelter than the width of said vehicle and the rear wall is folded during transportation to a width substantially no wider than said vehicle.

12. The subject matter of claim 11 in which the hinged connection of said rear wall to said shelter roof is by connecting means spacing said rear wall from said central roof portion in said folded position of said rear wall, thereby providing room in the folded, stored condition of said shelter in transportation for the folded side roof portions and folding side panels between said central roof portion and said door frame.

13. The subject matter of claim 12 in which said connecting means includes a short wall depending from said shelter roof and hinges between said door frame and said short wall, whereby the hinge line is spaced from said shelter roof to provide room for folded parts between said central roof portion and said door frame.

14. The subject matter of claim 10 in which there are side walls of flexible sheet material which have hemmed upper margins containing cords producing rounded and stiffened upper edges and the side edges of said roof having means forming slotted grooves therealong removably receiving and securing said upper edges of said side walls, whereby said side walls may be disassembled for transportation.

15. The subject matter of claim 10 in which there is a front wall fitting around the rear end of said vehicle formed of flexible sheet material including portions at each side and above and below said vehicle, said portions having hems and cord means in said hems adapted to secure said front wall to said vehicle by drawing said portions around sides, top and bottom of said vehicle by means of said hems and cord means and by then tieing the same, said vehicle being a station wagon with rear door means whereby the interior of said vehicle may be opened to said shelter for convenient use of shelter and vehicle space.

16. The subject matter of claim 15 in which said portions of said front wall have flaps extending beyond said hems which may be stuffed in concave portions of said vehicle in the plane of said front wall not closed when said hems and cord means are drawn about said vehicle.

17. The subject matter of claim 16 in which there are side walls formed by flexible sheet material, said front and side walls including a first section of flexible sheet material forming one side wall and one side portion of said front wall and including a second section forming the other side wall, the other side portion of said front wall and said portions of said front wall above and below the vehicle, and fastening means to secure together the two sections and for securing the same to rear wall means, and said side walls having hemmed lower edges and rods therein for weighting the same to bear on the ground.

18. The subject matter of claim 10 in which there are upright posts between the ground and the forward corners of said side roof portions to support the forward ends of said side roof portions in extended position, and in which the lower ends of said upright posts are pointed and penetrate the ground and in which said forward corners of said side roof portions have collars receiving the upper portions of said upright posts and set screw means in collars securing therein said posts in adjusted position depending on the length from the ground to said side roof portions, there being flexible sheet side and forward end walls depending from the edges of said shelter roof and there being formed in said flexible sheet walls at the corners between side and forward end walls open ended upright pockets receiving said posts to conceal the same and whereby said posts support said flexible sheet walls in forming corners therein.

19. The subject matter of claim 10 in which said shelter roof includes end transverse stiffening members and said hinged connection between said side roof portions and said central roof portion includes hinge members each having a hinge arm disposed alongside one of said end transverse members and there being pin means between said end transverse members and said hinge arms extending through aligned openings therein for securing said side roof portions in said first extended position, and there being securing means connected to said shelter roof for holding said side roof portions in place in said second folded position.

20. The improvement in the combination of an automotive passenger vehicle and a shelter forming an enclosure behind and at the rear end of said vehicle and to be transported on the top of said vehicle, comprising:
(a) a generally rigid sheet shelter roof,
(b) means supporting said shelter roof in use in forming said enclosure,
(c) a rear wall supporting the rear end of said roof in erected condition of said shelter which is normally wider than said vehicle, said rear wall being hingedly connected to said shelter roof and being formed by a rigid sheet-like centrally located door, by a door frame, and by rigid sheet-like side panels at each side of said door frame and hingedly connected to said door frame to pivot about axes parallel to said door frame sides and pivotal from a first extended position during use as a shelter at the rear of said vehicle in which said side panels extend outwardly from said door frame in the same general plane, to a second folded position during storage on said vehicle top in which said side panels are folded and abut said door frame and door and said rear wall is upwardly folded to abut said roof, whereby a shelter is provided which is wider during use as a shelter than the width of said vehicle and the rear wall is folded during transportation to a width substantially no wider than said vehicle.

21. The subject matter of claim 20 in which said vehicle has on its top support means for supporting the shelter on said vehicle, said rear wall having engaging means which depend therefrom when said rear wall is upwardly folded and engaging in said support means when the shelter is disposed for transportation on the top of said vehicle to help secure said shelter in place.

22. The subject matter of claim 21 in which said roof has near its forward end engaging means depending therefrom and engaging in said support means when the shelter is disposed for transportation on the top of said vehicle to help secure said shelter in place.

23. The subject matter of claim 21 in which said support means are paired, spaced tracks and said engaging means depending from said roof are rollers whereby in moving said shelter onto said vehicle for transportation the front end of said roof is supported by said rollers traveling on said tracks.

24. The improvement in the combination of a vehicle, such as a station wagon or the like, having rear door means and a shelter forming an enclosure behind and at the rear end of such vehicle, said shelter including a roof and rear and side walls, the improvement, comprising: said shelter having a front wall fitting around the rear end of said vehicle so that said vehicle becomes part of the front enclosing means of said shelter, the space inside of said vehicle communicating with the space inside of said shelter for common use in sleeping and other camping shelter functions, said front wall being formed of flexible sheet material including portions at each side and above and below said vehicle, said portions having hems and cord means in said hems, and said hems and cord means securing said front wall to said vehicle by said portions being drawn around sides, top and bottom of said vehicle and said cord means being tied.

25. The subject matter of claim 24 in which said portions of said front wall have flaps extending beyond said hems which may be stuffed in concave portions of said vehicle in the plane of said front wall not closed when said hems and cord means are drawn about said vehicle.

References Cited

UNITED STATES PATENTS

| | | | |
|---|---|---|---|
| 2,710,977 | 6/1955 | Fannin | 296—23 X |
| 2,259,783 | 10/1941 | Sparling | 296—23 X |
| 3,186,419 | 6/1965 | McCarroll | 135—1 |
| 3,019,803 | 2/1962 | Moody | 135—4 |
| 2,646,097 | 7/1953 | Gaverth | 135—1 |
| 1,659,825 | 2/1928 | MacKay | 135—5 |

FOREIGN PATENTS

| | | |
|---|---|---|
| 1,024,233 | 3/1966 | Great Britain. |
| 1,239,929 | 8/1961 | France. |

PHILIP GOODMAN, *Primary Examiner.*

U.S. Cl. X.R.

135—1